United States Patent [19]

Chang et al.

[11] Patent Number: 4,515,682

[45] Date of Patent: May 7, 1985

[54] CATALYSIS OVER ACTIVATED HIGH SILICA ZEOLITES

[75] Inventors: Clarence D. Chang, Princeton; Joseph N. Miale, Lawrenceville, both of N.J.

[73] Assignee: Mobil Oil Corporation, New York, N.Y.

[21] Appl. No.: 581,498

[22] Filed: Feb. 17, 1984

Related U.S. Application Data

[63] Continuation-in-part of Ser. No. 375,076, May 5, 1982, Pat. No. 4,444,900.

[51] Int. Cl.$^3$ .................... C10G 11/05; C10G 47/08; C10G 47/16
[52] U.S. Cl. .................... 208/111; 208/117; 208/120; 585/408; 585/431; 585/440; 585/452; 585/454; 585/459; 585/470; 585/481; 585/533; 585/640; 585/654; 585/733
[58] Field of Search ............... 208/109, 110, 111, 118, 208/119, 120, 117

[56] References Cited

U.S. PATENT DOCUMENTS

| 3,297,564 | 1/1967 | Peck et al. | 208/111 |
| 3,524,808 | 8/1970 | Quik et al. | 208/111 |
| 3,707,461 | 12/1972 | Gatsis | 208/111 |
| 4,427,786 | 1/1984 | Miale et al. | 502/61 |
| 4,427,787 | 1/1984 | Miale et al. | 502/71 |
| 4,427,788 | 1/1984 | Miale et al. | 502/71 |
| 4,427,789 | 1/1984 | Miale et al. | 502/71 |
| 4,427,790 | 1/1984 | Miale et al. | 502/71 |
| 4,427,791 | 1/1984 | Miale et al. | 502/203 |
| 4,435,516 | 3/1984 | Chang et al. | 502/71 |
| 4,438,215 | 3/1984 | Dessau et al. | 502/71 |
| 4,443,554 | 4/1984 | Dessau | 502/71 |
| 4,444,902 | 4/1984 | Chang et al. | 502/71 |
| 4,461,845 | 7/1984 | Dessau et al. | 502/27 |

Primary Examiner—Delbert E. Gantz
Assistant Examiner—O. Chaudhuri
Attorney, Agent, or Firm—Alexander J. McKillop; Michael G. Gilman; Dennis P. Santini

[57] ABSTRACT

A process is provided for conducting organic compound conversion over a catalyst composition comprising a specially treated crystalline zeolite having a high initial silica-to-alumina mole ratio, said zeolite having been synthesized from a reaction mixture comprising a diamine as a cation source. The treatment of the zeolite material comprises the sequential steps of reacting the zeolite with a dilute hydrogen fluoride solution, contacting the hydrogen fluoride solution reacted material with aluminum chloride vapor, and then treating the aluminum chloride contacted material to convert it to hydrogen form.

17 Claims, No Drawings

CATALYSIS OVER ACTIVATED HIGH SILICA ZEOLITES

CROSS-REFERENCE TO RELATED APPLICATION

This application is a continuation-in-part of application Ser. No. 375,076, filed May 5, 1982, now U.S. Pat. No. 4,444,900.

BACKGROUND OF THE INVENTION

1. Field of the Invention

This invention relates to a process for conducting organic compound conversion over catalyst comprising certain high silica-containing crystalline material having been sythesized from a reaction mixture containing a diamine as a cation source, said crystalline material having been treated by steps of reacting the crystalline material with a dilute solution of hydrogen fluoride, contacting the hydrogen fluoride solution contacted material with aluminum chloride vapor, and then converting the aluminum chloride vapor contacted material to hydrogen form, such as, for example, by contact with a hydrogen ion precursor, e.g. an ammonium salt solution, or ammoloysis, and calcination.

2. Description of Prior Art

Zeolitic materials, both natural and synthetic, have been demonstrated in the past to have catalytic properties for various types of hydrocarbon conversions. Certain zeolitic materials are ordered, porous crystalline aluminosilicates having a definite crystalline structure within which there are a large number of smaller cavities which may be interconnected by a number of still smaller channels. Since the dimensions of these pores are such as to accept for adsorption molecules of certain dimensions while rejection those of larger dimensions, these materials have come to be known as "molecular sieves" and are utilized in a variety of ways to take advantage of these properties.

Such molecular sieves, both natural and synthetic, include a wide variety of positive ion-containing crystalline aluminosilicates. These aluminosilicates can be described as a rigid three-dimensional framework SiO$_4$ and AlO$_4$ in which the tetrahedra are cross-linked by the sharing of oxygen atoms whereby the ratio of the total aluminum and silicon atoms to oxygen is 1:2. The electrovalence of the tetrahedra containing aluminum is balanced by the inclusion in the crystal of a cation, for example, an alkali metal or an alkaline earth metal cation. This can be expressed wherein the ratio of aluminum to the number of various cations, such as Ca/2, Sr/2, Na, K or Li is equal to unity. One type of cation may be exchanged either entirely or partially by another type of cation utilizing ion exchange techniques in a conventional manner. By means of such cation exchange, it has been possible to vary the properties of a given aluminosilicate by suitable selection of the cation. The spaces between the tetrahedra are occupied by molecules of water prior to dehydration.

Prior art techniques have resulted in the formation of a great variety of synthetic aluminosilicates. These aluminosilicates have come to be designated by convenient symbols, as illustrated by zeolite ZSM-5 (U.S. Pat. No. 3,702,886).

High silica-containing synthetic zeolites are well known in the art and it is generally accepted that the ion exchange capacity of the crystalline zeolite is directly dependent on its aluminum content. Thus, for example, the more aluminum there is in a crystalline structure, the more cations are required to balance the electronegativity thereof, and when such cations are of the acidic type such as hydrogen, they impart tremendous catalytic activity to the crystalline material. On the other hand, high silica-containing zeolites having little or substantially no aluminum, have many important properties and characteristics and a high degree of structural stability such that they have become candidates for use in various processes including catalytic processes. Materials of this type are known in the art and include high silica-containing aluminosilicates such as ZSM-5, ZSM-11 (U.S. Pat. No. 3,709,979), and ZSM-12 (U.S. Pat. No. 3,832,449) to mention a few.

The silica-to-alumina ratio of a given zeolite is often variable; for example, zeolite X (U.S. Pat. No. 2,882,244) can be synthesized with a silica-to-alumina ratio of from 2 to 3; zeolite Y (U.S. Pat. No. 3,130,007) from 3 to about 6. In some zeolites, the upper limit of silica-to-alumina ratio is virtually unbounded. Zeolite ZSM-5 is one such material wherein the silica-to-alumina ratio is at least 5. U.S. Pat. No. 3,941,871 discloses a crystalline metal organo silicate essentially free of aluminum and exhibiting an x-ray diffraction pattern characteristic of ZSM-5 type aluminosilicate. U.S. Pat. Nos. 4,061,724; 4,073,865 and 4,104,294 describe microporous crystalline silicas or organo silicates wherein the aluminum content present is at impurity levels.

Because of the extremely low aluminum content of these high silica-containing synthetic zeolites, their ion exchange capacity is not as great as materials with a higher aluminum content. Therefore, when these materials are contacted with an acidic solution and thereafter are processed in a conventional manner, they are not as catalytically active as their higher aluminum-containing counterparts.

The novel process of this invention permits the preparation of certain synthetic high silica-containing materials which have all the desirable properties inherently possessed by such high silica materials and, yet, have an acid activity which heretofore has only been possible to be achieved by materials having a higher aluminum content in their "as synthesized" form. It further permits valuable activation of crystalline zeolites having much lower silicate-to-alumina mole ratios.

It is noted that U.S. Pat. No. 3,354,078 and 3,644,220 relate to treating crystalline aluminosilicates with volatile metal halides. Neither of these latter patents is, however, concerned with treatment of crystalline materials having a high silica-to-alumina mole ratio or with treatment of any crystalline zeolite with hydrogen fluoride in the present manner. In fact, the use of hydrogen fluoride with aluminosilicates has been avoided because of resulting lattice damage. Hydrogen fluoride in high concentrations, e.g. 5 N or greater, readily attacks both silica and alumina. Lower concentrations may also damage lattice structures if contact is maintained for too long a time. With some zeolitic materials, hydrogen fluoride treatment under controlled conditions has been used to alter pore size. U.S. Pat. Nos. 3,997,474 and 4,054,511 relate to altering effective pore size of natural ferrierite ore with very dilute hydrogen fluoride treatment. However, the same treatment of erionite resulted in a large loss in activity and crystallinity.

SUMMARY OF THE INVENTION

The present invention relates to a novel process for converting organic compounds over a catalyst comprising a zeolite initially synthesized from a reaction mixture comprising a diamine as a cation source, said zeolite having altered activity resulting from a method comprising the sequential steps of reacting the zeolite with a dilute aqueous solution of hydrogen fluoride (e.g. less than about 1.5 weight percent HF) for a time of less than about one hour, contacting the hydrogen fluoride reacted zeolite with aluminum chloride vapor, treating the aluminum chloride contacted zeolite by contact with an ammonium salt solution or by ammonolysis, and calcining the resulting material. The resulting calcined material exhibits enhanced Bronsted acidity and, therefore, improved acid activity toward catalysis of numerous chemical reactions, such as, for example, cracking of organic, e.g. hydrocarbon, compounds.

DESCRIPTION OF SPECIFIC EMBODIMENTS

This application is a continuation-in-part of application Ser. No. 375,076, filed May 5, 1982, now U.S. Pat. No. 4,444,900, incorporated in its entirety herein by reference. The expression "high silica-containing crystalline material" is intended to define a crystalline structure which has an initial silica-to-alumina ratio greater than 100 and more preferably greater than 500, up to and including those highly siliceous materials where the silica-to-alumina ratio is infinity or as reasonably close to infinity as practically possible. This latter group of highly siliceous materials is exemplified by U.S. Pat. Nos. 3,941,871; 4,061,724; 4,073,865 and 4,104,294 wherein the materials are prepared from reaction solutions which involve no deliberate addition of aluminum. However, trace quantities of aluminum are usually present due to the impurity of the reaction solutions. It is to be understood that the expression "high silica-containing crystalline material" also specifically includes those materials which have other metals besides aluminum associated therewith, such as boron, iron, chromium, etc. Thus, a requirement with regard to the starting materials utilized in the novel process of this invention is that they have an initial silica-to-alumina ratio greater than about 100 (irrespective of what other materials or metals are present in the crystal structure).

The synthetic zeolite starting materials utilized herein, including those having a silica-to-alumina mole ratio greater than about 100, are synthesized from reaction mixtures containing diamines as cation sources. Zeolites prepared with other sources of cations in the reaction mixture may be activated by exposure to aluminum halide vapor at elevated temperature. However, zeolites synthesized from reaction mixtures containing diamines as cation sources will not be activated by such a method as hereinafter exemplified. The present method significantly activates such zeolite materials as will also be exemplified. Non-limiting examples of diamines used as cation sources in zeolite synthesis reaction mixtures include $C_4$ to $C_{10}$ diamines, e.g. 1,5-diaminopentane.

The process of treating the zeolite for use herein is simple and easy to carry out although the results therefrom are dramatic. It is carried out by reacting the zeolite with a dilute aqueous solution of hydrogen fluoride of from about 0.1 to about 5 Normal, said reaction being conducted at a temperature of from about 0° C. to about 30° C., preferably at about ambient temperature, for a time of less than about 60 minutes, preferably from about 5 minutes to less than about 60 minutes. The hydrogen fluoride reacted zeolite is washed, usually with cold water, dried, usually by heating to about 130° C., and then contacted with volatile aluminum chloride at a temperature of from about 100° C. to about 850° C., preferably from about 100° C. to about 550° C. The aluminum chloride contacted zeolite is dried, again usually by heating to about 130° C., and contacted with an ammonium salt solution, e.g. 1N $NH_4NO_3$, or with ammonium hydroxide or ammonia, and thereafter calcined at a temperature of from about 200° C. to abot 600° C. in an inert atmosphere of air, nitrogen, etc. at subatmospheric, atmospheric or superatmospheric pressures for from about 1 minute to about 48 hours.

The amount of hydrogen fluoride which is utilized in the process of this invention is from about 0.02 to about 0.2 grams of hydrogen fluoride per gram of crystalline zeolite material being treated.

The ammonium salt solution contacting step may be conducted for a period of time of from about 1 hour to about 20 hours at a temperature of from about 0° C. to about 90° C. The ammonium salt used is not narrowly critical and will normally be an inorganic salt such as ammonium nitrate, ammonium sulfate, ammonium chloride, etc. If the ammonium salt solution is aqueous, it will be from about 0.1 to about 5 Normal, preferably about 1 Normal.

If instead of contacting the aluminum chloride contacted zeolite with an ammonium salt solution, ammonolysis is conducted, the zeolite will be contacted with 0.1 to 5 Normal ammonium hydroxide at a temperature of from about 0° C. to about 90° C. for a time of from about 1 hour to about 20 hours, or with moist or dry gaseous ammonia at a temperature of from about 50° C. to about 200° C. for a time of from about 10 minutes to about 2 hours.

Of the high silica zeolite materials advantageously treated in accordance herewith, zeolites ZSM-5, ZSM-11, ZSM-35 and ZSM-48 are particularly noted. ZSM-5 is described in U.S. Pat. Nos. 3,702,886 and Re. 29,948, the entire contents of each being hereby incorporated by reference herein. ZSM-11 is described in U.S. Pat. No. 3,709,979, the entire teaching of which is incorporated herein by reference. The entire contents of U.S. Pat. Nos. 4,016,245 and 4,397,827, describing ZSM-35 and ZSM-48, respectively, are incorporated herein by reference.

In general, organic compounds such as, for example, those selected from the group consisting of hydrocarbons, alcohols and ethers, are converted to conversion products such as, for example, aromatics and lower molecular weight hydrocarbons, over the activity enhanced crystalline zeolites prepared as above by contact under oganic compound conversion conditions including a temperature of from about 100° C. to about 800° C., a pressure of from about 0.1 atmosphere (bar) to about 200 atmospheres, a weight hourly space velocity of from about 0.08 $hr^{-1}$ to about 2000 $hr^{-1}$ and a hydrogen/feedstock organic compound mole ratio of from 0 (no added hydrogeln) to about 100.

Such conversion processes include, as non-limiting examples, cracking hydrocarbons to lower molecular weight hydrocarbons with reaction conditions including a temperature of from about 300° C. to about 800° C., a pressure of from about 0.1 atmosphere (bar) to about 35 atmospheres and a weight hourly space velocity of from about 0.1 to about 20; dehydrogenating hydrocarbon compounds with reaction conditions including a temperature of from about 300° C. to about 700° C., a pressure of from about 0.1 atmosphere to about 10 atmospheres and a weight hourly space velocity of from about 0.1 to about 20; converting paraffins to aromatics with reaction conditions including a temperature of from about 100° C. to about 700° C., a pressure of from about 0.1 atmosphere to about 60 atmospheres, a weight hourly space velocity of from about 0.5 to about 400 and a hydrogen/hydrocarbon mole ratio of from about 0 to about 20; converting olefins to aromatics, e.g. benzene, toluene and xylenes, with reaction conditions including a temperature of from about 100° C. to about 700° C., a pressure of from about 0.1 atmosphere to about 60 atmospheres, a weight hourly space velocity of from about 0.5 to about 400 and a hydrogen/hydrocarbon mole ratio of from about 0 to about 20; converting alcohols, e.g. methanol, or ethers, e.g. dimethylether, or mixtures thereof to hydrocarbons including aromatics with reaction conditions including a temperature of from about 275° C. to about 600° C., a pressure of from about 0.5 atmosphere to about 50 atmospheres and a liquid hourly space velocity of from about 0.5 to about 100; isomerizing xylene feedstock components to product enriched in p-xylene with reaction conditions including a temperature from about 230° C. to about 510° C., a pressure of from about 3 atmospheres to about 35 atmospheres, a weight hourly space velocity of from about 0.1 to about 200 and a hydrogen/hydrocarbon mole ratio of from about 0 to about 100; disproportionating toluene to product comprising benzene and xylenes with reaction conditions including a temperature of from about 200° C. to about 760° C., a pressure of from about atmospheric to about 60 atmospheres and a weight hourly space velocity of from about 0.08 to about 20; alkylating aromatic hydrocarbons, e.g. benzene and alkylbenzenes, in the presence of an alkylating agent, e.g. olefins, formaldehyde, alkyl halides and alcohols, with reactions conditions including a temperature of from about 340° C. to about 500° C., a pressure of from about atmospheric to about 200 atmospheres, a weight hourly space velocity of from about 2 to about 2000 and an aromatic hydrocarbon/alkylating agent mole ratio of from about 1/1 to about 20/1; and transalkylating aromatic hydrocarbons in the presence of polyalkylaromatic hydrocarbons with reaction conditions including a temperature of from about 340° C. to about 500° C., a pressure of from about atmospheric to about 200 atmospheres, a weight hourly space velocity of from about 10 to about 1000 and an aromatic hydrocarbon/polyalkylaromatic hydrocarbon mole ratio of from about 1/1 to about 16/1.

In practicing a particularly desired chemical conversion process, it may be useful to incorporate the above-described activity enhanced crystalline zeolite with matrix comprising another material resistant to the temperature and other conditions employed in the process. Such matrix material is useful as a binder and imparts additional resistance to the catalyst for the severe temperature, pressure and reactant feed stream velocity conditions encountered in many cracking processes.

Useful matrix materials include both synthetic and naturally occurring substances, as well as inorganic materials such as clay, silica and/or metal oxides. The latter may be either naturally occurring or in the form of gelatinous precipitates or gels including mixtures of silica and metal oxides. Naturally occurring clays which can be composited with the zeolite include those of the montmorillonite and kaolin families which include the subbentonites and the kaolins commonly known as Dixie, McNamee, Georgia and Florida clays or others in which the main mineral constituent is halloysite, kaolinite, dickite, nacrite or anauxite. Such clays can be used in the raw state as originally mined or initially subjected to calcination, acid treatment or chemical modification.

In addition to the foregoing matrix materials, the catalyst employed herein may be composited with porous matrix material such as alumina, silica-alumina, silica-magnesia, silica-zirconia, silica-thoria, silica-beryllia, and silica-titania, as well as ternary compositions, such as silica-alumina-thoria, silica-alumina-zirconia, silica-alumina-magnesia and silica-magnesia-zirconia. The matrix may be in the form of a cogel. The relative proportions of activity enhanced zeolite component and matrix, on an anhydrous basis, may vary widely with the zeolite content ranging from about 1 to about 99 percent by weight and more usually in the range of about 5 to about 80 percent by weight of the total dry composite.

The following examples will illustrate the novel method of the present invention.

EXAMPLE 1

A six gram quantity of zeolite ZSM-48 was synthesized as above indicated with the reaction mixture containing 1,5-diamino-pentane as the source of cations. The zeolite product had a silica-to-alumina mole ratio of 870. It was calcined at 538° C. for one hour with helium flow and for four hours in air.

EXAMPLE 2

A 4.5 gram portion of the calcined zeolite ZSM-48 from Example 1 was reacted with 50 ml of 1 percent (0.5N) hydrogen fluoride solution for ten minutes at 20° C. and then water washed with cold water. The hydrogen fluoride reacted zeolite was dried at about 130° C. and then contacted with 1N aqueous solution of $NH_4NO_3$ (no aluminum chloride contacting) for 4 hours at 80° C. and calcined at 538° C. in air for 60 minutes.

EXAMPLE 3

A 1.5 gram portion of the calcined zeolite ZSM-48 from Example 1 was reacted with 50 ml of 1 percent (0.5N) hydrogen fluoride solution for ten minutes at 20° C. and then water washed with cold water. The hydrogen fluoride reacted zeolite was dried at about 130° C. and loaded into a glass tube with 3 grams of anhydrous aluminum chloride on the upstream end. The tube was heated slowly (about 2° C. per minute) from 100° C. to 550° C. with helium flowing at about 20 ml/minute. This caused aluminum chloride vapor to pass through the zeolite for about 240 minutes. The aluminum chloride contacted zeolite was removed from the tube, dried at about 130° C., treated with 1N $NH_4NO_3$ and calcined as in Example 2.

EXAMPLE 4

The final products of Examples 2 and 3 were subjected to the Alpha Test to measure catalytic activity. As is known in the art, the Alpha Value is an approximate indication of the catalytic cracking activity of the catalyst compared to a standard catalyst and it gives the relative rate constant (rate of normal hexane conversion per volume of catalyst per unit time). It is based on the activity of the highly active silica-alumina cracking catalyst taken as an Alpha of 1 (rate constant=0.016). The Alpha Test is described in U.S. Pat. No. 3,354,078 and in The Journal of Catalysis, Vol. IV, pp. 522–529 (August 1965). The results of this test are listed below:

| Product of Example | Treatment + Calcination | Alpha Value |
|---|---|---|
| 2 | HF + NH₄NO₃ | 4.4 |
| 3 | HF + AlCl₃ + NH₄NO₃ | 13 |

EXAMPLE 5

A sample of zeolite ZSM-48 was synthesized as above indicated with the reaction mixture containing 1,8-octanediamine as the cation source. This zeolite product had a silica-to-alumina mole ratio of 180. It was calcined as in Example 1.

EXAMPLE 6

An aliquot of the zeolite product of Example 5 was contacted with 1N NH₄NO₃ for 18 hours at 20° C. (no hydrogen fluoride or aluminum chloride treatment) and then calcined as in Example 1.

EXAMPLE 7

Another aliquot of the Example 5 zeolite product was contacted with aluminum chloride vapor as in Example 3 (no hydrogen fluoride treatment), dried at about 130° C., treated with 1N NH₄NO₃ and calcined as in Example 3.

EXAMPLE 8

A quantity of the product of Example 7 was reacted with 40 ml of 1 percent (0.5N) hydrogen fluoride solution for ten minutes at 20° C. and then washed with cold water. It was then treated with 1N NH₄NO₃ as in Example 3 (no aluminum chloride treatment subsequent to hydrogen fluoride treatment), washed, dried and calcined for 30 minutes at 538° C. in air.

EXAMPLE 9

A quantity of product of Example 7 was treated with hydrogen fluoride as in Example 8 and washed with water. It was then, however, contacted with aluminum chloride, contacted with NH₄NO₃ and calcined as in Example 3.

EXAMPLE 10

Quantities of the final products of Examples 5, 6, 7, 8 and 9 were subjected to the Alpha Test. The results of this test are listed below:

| Product of Example | Treatment + Calcination | Alpha Value |
|---|---|---|
| 5 | (base) | less than 1 |
| 6 | NH₄NO₃ | 31 |
| 7 | AlCl₃ + NH₄NO₃ | 30 |
| 8 | Ex. 7 + HF + NH₄NO₃ | 28 |
| 9 | Ex. 7 + HF + AlCl₃ + NH₄NO₃ | 65 |

All of the above experiments demonstrate that there is a response to the aluminum chloride treatment for these zeolites having been prepared from a reaction mixture containing a diamine as the cation source only when a hydrogen fluoride treatment step precedes the aluminum chloride treatment step. Note in Example 9 that the zeolite not previously activated by contact with aluminum chloride (Example 7) was substantially activated when it was treated with hydrogen fluoride prior to aluminum chloride treatment.

What is claimed is:

1. A process for converting a feedstock comprising hydrocarbon compounds to conversion products comprising hydrocarbon compounds of lower molecular weight than feedstock hydrocarbon compounds which comprises contacting said feedstock at conversion conditions with a catalyst composition comprising a crystalline zeolite having an initial silica:alumina mole ratio greater than about 100:1 and having been synthesized from a reaction mixture comprising a diamine, said zeolite being treated by the squential steps of reacting said zeolite with a dilute aqueous solution of hydrogen fluoride of from about 0.1 to about 5 Normal at a temperature of from about 0° C. to about 30° C. for a time of less than about 60 minutes, contacting said hydrogen fluoride reacted zeolite with aluminum chloride vapor at a temperature of from about 100° C. to about 850° C., and converting said aluminum chloride contacted zeolite to hydrogen form.

2. The process of claim 1 wherein said zeolite has an initial silica:alumina mole ratio greater than about 500:1.

3. The process of claim 1 wherein said conversion of said aluminum chloride contacted zeolite to the hydrogen form comprises contact of said zeolite with a hydrogen ion precursor solution followed by calcination.

4. The process of claim 3 wherein said hydrogen ion precursor solution is a solution of an ammonium salt selected from the group consisting of ammonium nitrate, ammonium sulfate and ammonium chloride.

5. The process of claim 1 wherein said conversion of said aluminum chloride contacted zeolite to the hydrogen form comprises treatment of said zeolite by ammonolysis followed by calcination.

6. The process of claim 1 wherein said zeolite has the structure of ZSM 5, ZSM-11, ZSM-35 or ZSM-48.

7. The process of claim 1 wherein said conversion conditions include a temperature of from about 100° C. to about 800° C., a pressure of from about 0.1 atmosphere to about 200 atmospheres, a weight hourly space velocity of from about 0.08 hr⁻¹ to about 2000 hr⁻¹ and a hydrogen/feedstock hydrocarbon compound mole ratio of from 0 to about 100.

8. The process of claim 1 wherein said conversion conditions include a temperature of from about 300° C. to about 800° C., a pressure of from about 0.1 atmosphere to about 35 atmospheres and a weight hourly space velocity of from about 0.1 hr⁻¹ to about 20 hr⁻¹.

9. The process of claim 1 wherein said catalyst composition further comprises a matrix material of alumina.

10. A process for converting a feedstock comprising hydrocarbon compounds to conversion products comprising hydrocarbon compounds of lower molecular weight than feedstock hydrocarbon compounds which comprises contacting said feedstock at conversion conditions with a catalyst composition comprising a crystalline zeolite having an initial silica:alumina mole ratio greater than 100:1 and the structure of zeolite ZSM-48, said crystalline zeolite having been treated by the sequential steps of reacting said zeolite with a dilute aqueous solution of hydrogen fluoride of from about 0.1 to about 5 Normal at a temperature of from about 0° C. to about 30° C. for a time of less than about 60 minutes, contacting said hydrogen fluoride reacted zeolite with aluminum chloride vapor at a temperature of from about 100° C. to about 850° C. , and converting said aluminum chloride contacted zeolite to hydrogen form.

11. The process of claim 10 wherein said zeolite has an initial silica:alumina mole ratio greater than about 500:1.

12. The process of claim 10 wherein said conversion of said aluminum chloride contacted zeolite to the hydrogen form comprises contact of said zeolite with a hydrogen ion precursor solution followed by calcination.

13. The process of claim 12 wherein said hydrogen ion precursor solution is a solution of an ammonium salt selected from the group consisting of ammonium nitrate, ammonium sulfate and ammonium chloride.

14. The process of claim 10 wherein said conversion of said aluminum chloride contacted zeolite to the hydrogen form comprises treatment of said zeolite by ammonolysis followed by calcination.

15. The process of claim 10 wherein said conversion conditions include a temperature of from about 100° C. to about 800° C., a pressure of from about 0.1 atmosphere to about 200 atmospheres, a weight hourly space velocity of from about 0.08 $hr^{-1}$ to about 2000 $hr^{-1}$ and a hydrogen/feedstock hydrocarbon compound mole ratio of from 0 to about 100.

16. The process of claim 10 wherein said conversion conditions include a temperature of from about 300° C. to about 800° C., a pressure of from about 0.1 atmosphere to about 35 atmospheres and a weight hourly space velocity of from about 0.1 $hr^{-1}$ to about 20 $hr^{-1}$.

17. The process of claim 10 wherein said catalyst composition further comprises a matrix material of alumina.

* * * * *